US006806702B2

(12) United States Patent
Lamb et al.

(10) Patent No.: US 6,806,702 B2
(45) Date of Patent: Oct. 19, 2004

(54) MAGNETIC ANGULAR POSITION SENSOR APPARATUS

(75) Inventors: Wayne A. Lamb, Freeport, IL (US); Kenneth V. Bechtold, Freeport, IL (US); Shaun Cinnamon, Freeport, IL (US); Kent E. Van Ostrand, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 19 days.

(21) Appl. No.: 10/267,820

(22) Filed: Oct. 9, 2002

(65) Prior Publication Data

US 2004/0070390 A1 Apr. 15, 2004

(51) Int. Cl.⁷ .................................................. G01B 7/30
(52) U.S. Cl. ........................... 324/207.25; 324/207.2; 324/207.21
(58) Field of Search ..................... 324/207.2, 207.21, 324/207.22, 207.25

(56) References Cited

U.S. PATENT DOCUMENTS

| 4,283,679 A | * | 8/1981 | Ito et al. ...................... 324/165 |
| 4,490,674 A | * | 12/1984 | Ito ......................... 324/207.25 |
| 5,055,781 A | * | 10/1991 | Sakakibara et al. .... 324/207.21 |
| 5,148,106 A | * | 9/1992 | Ozawa ................... 324/207.21 |
| 5,164,668 A | | 11/1992 | Alfors ....................... 324/207.2 |
| 5,602,471 A | * | 2/1997 | Muth et al. ............. 324/207.21 |
| 5,627,465 A | | 5/1997 | Alfors et al. ............. 324/207.2 |
| 5,670,875 A | | 9/1997 | Alfors et al. ............... 324/202 |
| 5,746,005 A | | 5/1998 | Steinberg ..................... 33/1 PT |
| 5,796,249 A | | 8/1998 | Andrä et al. ............ 324/207.21 |
| 5,818,038 A | | 10/1998 | Kerkmann et al. ..... 250/231.13 |
| 5,831,554 A | | 11/1998 | Hedayat et al. ............... 341/20 |
| 6,138,564 A | | 10/2000 | Eckardt et al. .............. 101/228 |
| 6,288,533 B1 | * | 9/2001 | Haeberli et al. .......... 324/207.2 |
| 6,288,535 B1 | | 9/2001 | Chass ...................... 324/207.2 |
| 6,429,647 B1 | | 8/2002 | Nicholson ................ 324/207.2 |
| 6,486,656 B1 | * | 11/2002 | Schroeder .............. 324/207.21 |
| 6,545,462 B2 | * | 4/2003 | Schott et al. ............. 324/207.2 |

FOREIGN PATENT DOCUMENTS

| JP | 6-137809 | * | 5/1994 | |
| WO | WO 98/54547 | | 12/1998 | ............ G01D/5/14 |

OTHER PUBLICATIONS

PCT Notification of Transmittal of the International Search Report or the Declaration Date of Mailing: Feb. 16, 2004 European Patent Office.

* cited by examiner

Primary Examiner—N. Le
Assistant Examiner—Darrell Kinder
(74) Attorney, Agent, or Firm—Kris T. Fredrick; Kermit D. Lopez; Luis Ortiz

(57) ABSTRACT

Angular position sensing apparatuses and methods are disclosed. An angular position sensing apparatus can include a rotatable base and two or more magnets located proximate to one another upon the rotatable base. The magnets are generally magnetized parallel and opposite to one another to create a uniform magnetic field thereof. Additionally, a sensor can be located external to the two magnets, such that the sensor comes into contact with the uniform magnetic field to sense a change in angular position associated with the rotatable base.

18 Claims, 6 Drawing Sheets

MAGNETIC ANGULAR POSITION SENSOR APPARATUS

TECHNICAL FIELD

The present invention is generally related to sensing methods and systems. The present invention is additionally related to sensors utilized in automotive and mechanical applications. The present invention is also related to magnetoresistors and Wheatstone bridge circuit configurations. The present invention is additionally related to angular position sensing methods and systems thereof.

BACKGROUND OF THE INVENTION

Various sensors are known in the magnetic-effect sensing arts. Examples of common magnetic-effect sensors include Hall effect and magnetoresistive technologies. Such magnetic sensors can generally respond to a change in the magnetic field as influenced by the presence or absence of a ferromagnetic target object of a designed shape passing by the sensory field of the magnetic-effect sensor. The sensor can then provide an electrical output, which can be further modified as necessary by subsequent electronics to yield sensing and control information. The subsequent electronics may be located either onboard or outboard of the sensor package.

Many automotive electronic systems make use of position sensors. When position sensors for automotive electronic systems were originally conceived and developed, such sensors were primarily utilized for the determination of clutch pedal and shift lever positions in automobile transmission applications. Reasonably accurate linear position sensing was required to identify the positions of the clutch pedal and the shift lever, using electrical signals from a non-contacting sensor approach. For example, in automated manual transmission applications, two sensors may be required to sense the shift lever position as it moves in an H-pattern from Reverse to Low to Second to Third gear. For a standard automatic transmission application, where the shift lever moves along a single axis direction, one position sensor may be required to sense whether the shift lever is in one of the gear operating positions (i.e., Reverse, Neutral, Drive, Low) as well as positions between such operating conditions.

Many of the sensors utilized in automotive applications are configured as angular position sensors, which provide feedback to a control unit. Many of these types of sensors and related systems are mechanical in nature and are very sensitive to the wearing of contacts, contact contamination, and so forth. To help solve many of the warranty problems associated with mechanical sensors, designers have searched for non-contacting electrical solutions provided by magnetoresistive and/or Hall-effect technologies, which have attempted to detect variance in a magnetic field. One of the primary problems with this approach is the inability of such systems to accurately detect position. The accuracy requirement of such systems makes it difficult, for example, to use a single Hall element because of the offset and shifts over temperature.

The difficulty with both Hall and magnetoresistive technologies is that a uniform magnetic field is required. With magnetoresistive technologies, the field strength must additionally be strong enough to saturate the elements. To obtain a uniform field, a ring magnet can be utilized with an IC located centrally thereof, or two magnets can face each other such that an IC is located therebetween. Mounting an IC between the magnets in this manner, however, is difficult to achieve.

The present inventors have thus concluded based on the foregoing that a need exists for an improved angular position sensor, which avoids the aforementioned problems and is adaptable to varying position sensing systems regardless of magnet strengths and dimensions.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor method and system.

It is another aspect of the present invention to provide for a sensor that can be used in automotive and mechanical applications.

It is yet another aspect of the present invention to provide for an angular positioning sensing apparatus and method thereof.

It is still another aspect of the present invention to provide for an angular position sensing apparatus that utilizes a magnetoresistive-based sensor.

It is also an aspect of the present invention to provide for an angular position sensing apparatus that utilizes a Hall sensor.

The aforementioned aspects of the invention and other objectives and advantages can now be achieved as is now summarized. An angular position sensing apparatus and method is disclosed herein. The angular position sensing apparatus includes a rotatable base and two or more magnets located proximate to one another upon the rotatable base. The magnets are generally magnetized parallel and opposite to one another to create a uniform magnetic field thereof. Additionally, a sensor can be located external to the two magnets, such that the sensor comes into contact with the uniform magnetic field to sense a change in angular position associated with the rotatable base.

The sensor can be mounted on a printed circuit board (PCB), which is also located external to the magnets. Such a sensor can be configured as, for example, a Hall sensor or a magnetoresistive sensor. If the sensor is configured as a magnetoresistive sensor, such a magnetoresistive sensor can also include a plurality of magnetoresistors arranged within a magnetoresistive bridge circuit. Alternatively, such a magnetoresistive sensor can include two magnetoresistive bridge circuits integrated with one another in a Wheatstone bridge configuration, wherein each of the magnetoresistive bridge circuits comprises four magnetoresistors. The sensor described herein can be configured as an integrated circuit.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
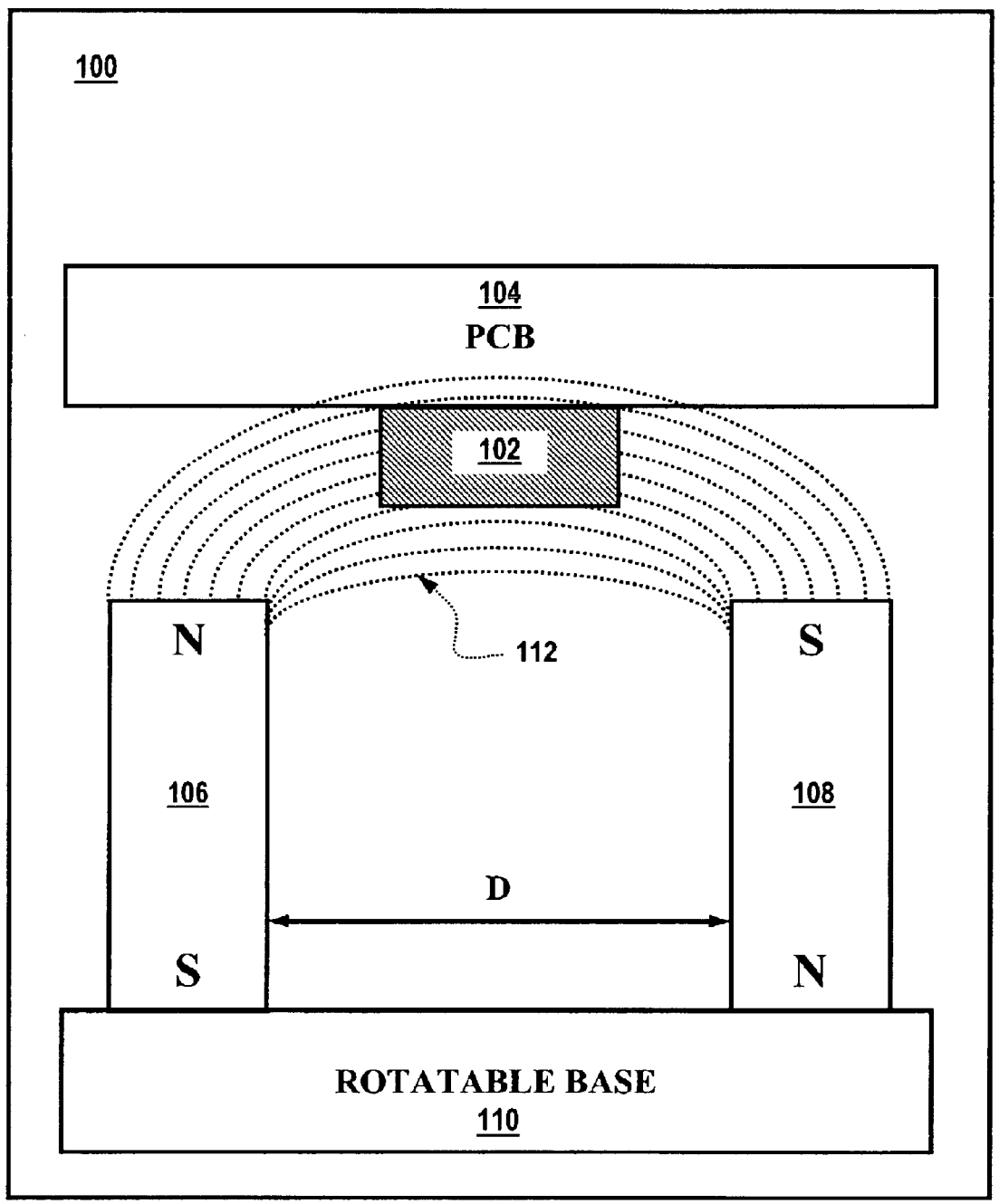
FIG. 1 depicts a side view of an angular position sensing apparatus, which can be implemented in accordance with a preferred embodiment of the present invention.

FIG. 1 depicts a side view of an angular position sensing apparatus 100, which can be implemented in accordance with a preferred embodiment of the present invention. Apparatus 100 generally includes a rotatable base 110 and a first magnet 106 located proximate to a second magnet 108 upon rotatable base 110. First magnet 106 is diametrically opposed at a distance D from second magnet 108. First and second magnets 106 and 108 are generally magnetized parallel and opposite to one another to create a uniform magnetic field 112 thereof. Apparatus 100 also includes a sensor 102 located respectively external to first and second magnets 106 and 108. Sensor 102 thus comes into contact with the uniform magnetic field 112 to sense a change in angular position associated with rotatable base 110. Sensor 102 can be mounted to a printed circuit board (PCB) 104, which is also respectively located external to first and second magnets 106 and 108.

Figure 2:
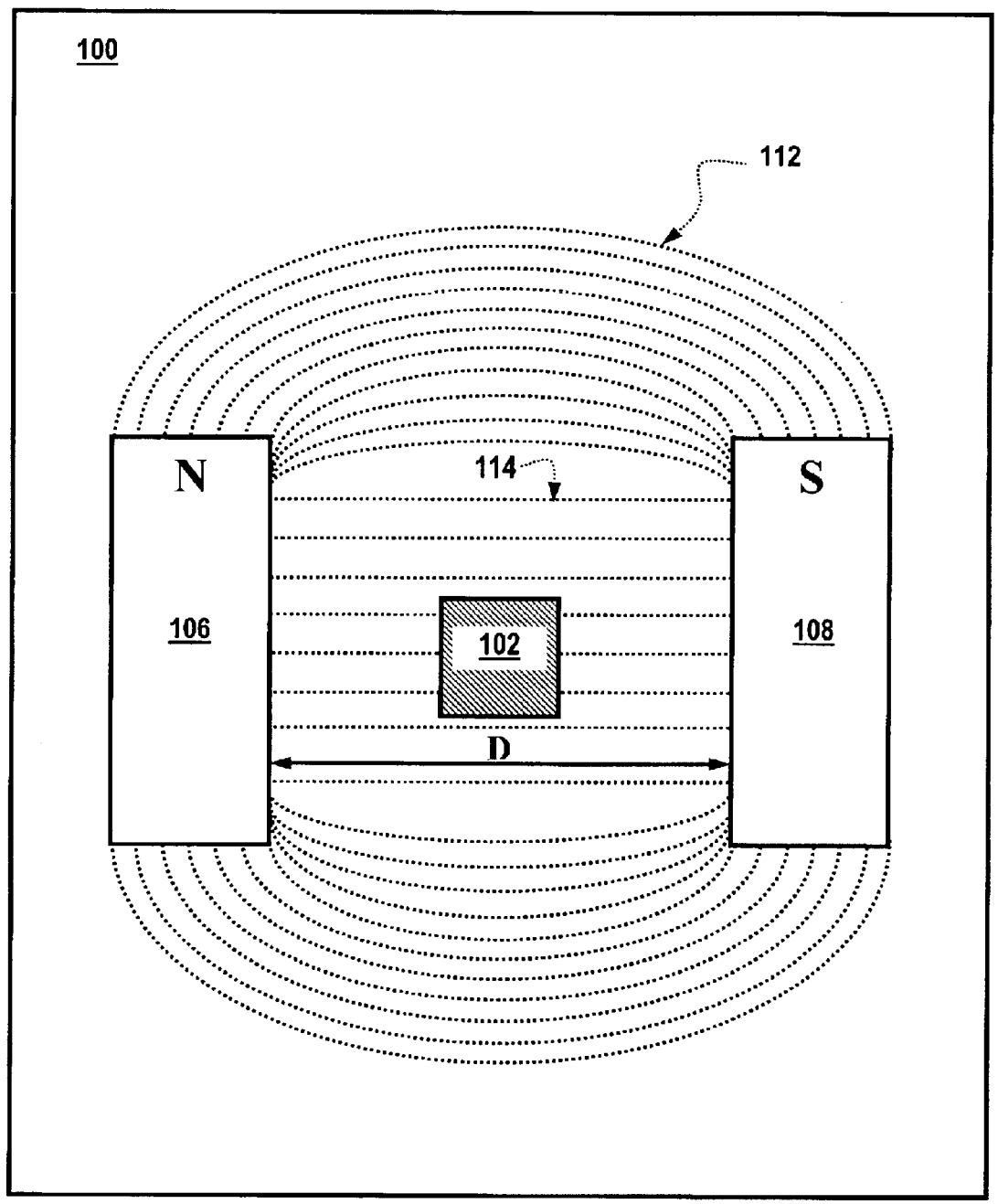
FIG. 2 depicts a top view of the angular position sensing apparatus depicted in FIG. 1, in accordance with a preferred embodiment of the present invention.

FIG. 2 depicts a top view of the angular position sensing apparatus 100 depicted in FIG. 1, in accordance with a preferred embodiment of the present invention. Note that in FIGS. 1 and 2, like or analogous parts are indicated by identical reference numerals. As shown in FIG. 2, first magnet 106 and second magnet 108 are generally located a distance D from one another in order to generate the uniform magnetic field 112. As further depicted in FIG. 2, sensor 102 is located centrally and in an axially displaced, non-overlapping manner above the top surfaces of first and second magnets 106 and 108. Magnetic field lines 114 are shown in FIG. 2 as straight lines to indicate uniform magnetic field linearity thereof.

Figure 3:
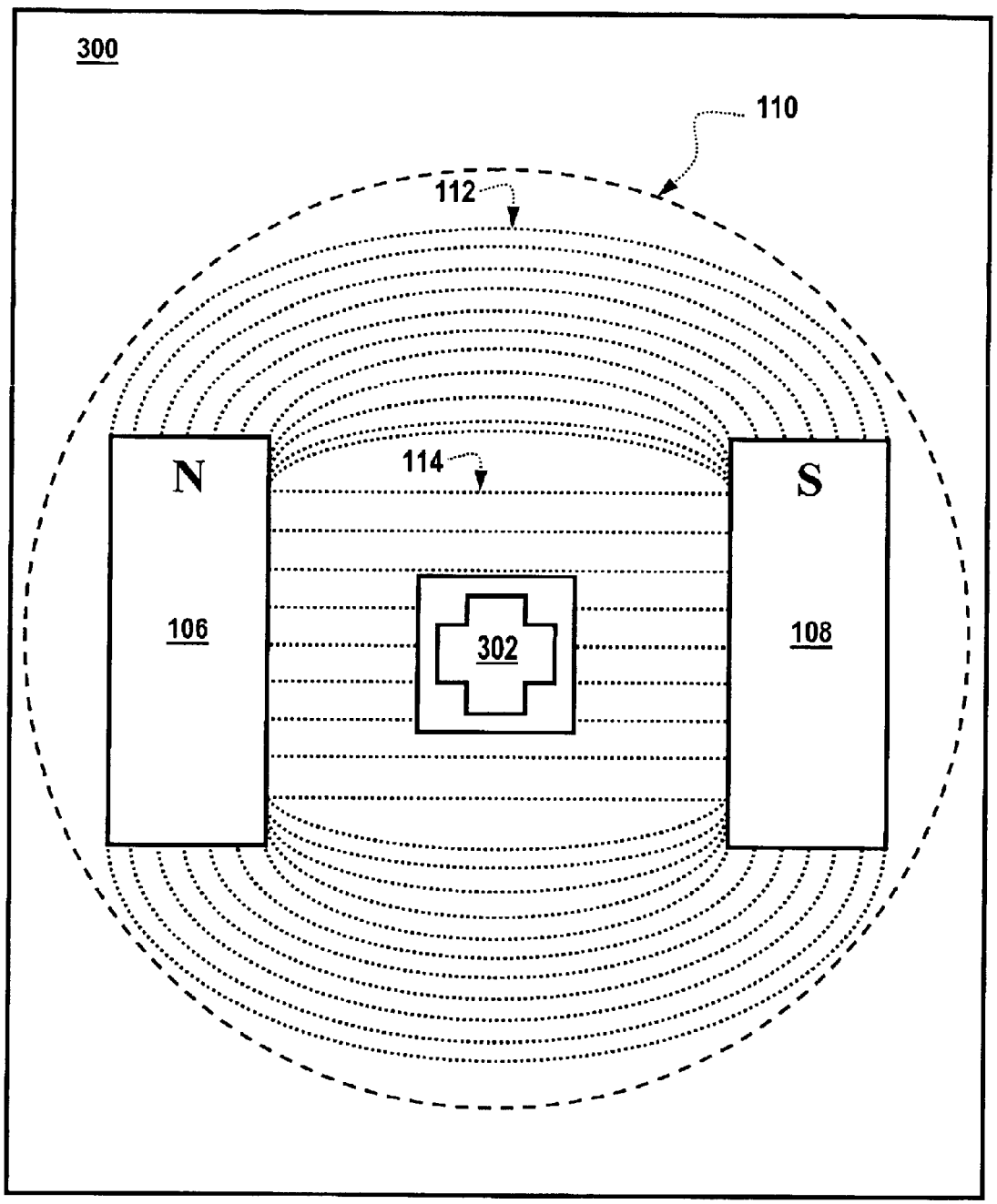
FIG. 3 depicts a top view of the angular position sensing apparatus depicted in FIGS. 1 and 2, including a magnetoresistive (MR) sensor thereof, in accordance with an alternative embodiment of the present invention.

FIG. 3 depicts a top view of an angular position sensing apparatus 300 that includes a magnetoresistive (MR) sensor 302 thereof, in accordance with a preferred embodiment of the present invention. Note that in FIGS. 1, 2 and 3, like or analogous parts are indicated by identical reference numerals. As shown in FIG. 3, MR sensor 302 is generally located centrally above magnets 106 and 108. Note that as utilized herein, the term "above" can refer to both vertical and horizontal positions. Magnetic field lines 112 and 114 are depicted in FIG. 3 between magnets 106 and 108.

It can be appreciated by those skilled in the art and familiar with the response of a permalloy (NiFe) anisotropic magnetoresistive (AMR) sensor that a change in sensor resistance can be achieved by changes in both an external applied magnetic field magnitude and an applied field angle, with respect to a current direction within the resistor runners up to a certain level, which is commonly referred to in the art as a saturation mode. Once a saturated magnetic field magnitude is attained, the anisotropic magnetoresistance no longer changes with increasing magnetic flux/densities. Above a saturated magnitude level, only changes in the angle direction of the resultant magnetic field vector with respect to the current direction in the resistor runner legs will cause the magnetoresistor to change.

Thus, when designing a permanent magnet, it is important to select a magnet material and size that always maintains a saturated magnetic field magnitude level at the fixed sensor location over the desired range of magnet travel. It is preferable that the sensor design of the present invention have a magnetic field of 80 gauss or higher to maintain the magnetoresistive sensing elements in saturation.

MR sensor 302 can therefore be configured as a single anisotropic magnetoresistive (AMR) permalloy sensing bridge configured from four thin-film resistors located at a fixed point from magnets 106 and 108 to provide a sinusoidal voltage signal as the resultant flux density vector varies with magnet travel. A magnet travel position can then be determined from the sinusoidal signal voltage curve.

Eight thin-film resistors can be electrically connected to form two separate Wheatstone sensing bridge configurations with a common geometrical center to provide two sinusoidal output signals, offset from one another, from which a signal curve can be extracted to determine the angular position of magnet travel. Although, eight thin-film resistors can be utilized, it can be appreciated by those skilled in the art that this number can be varied, depending on design parameters. Other configurations can utilize, for example, a four-magnetoresistor bridge circuit for magnetic sensing thereof. An example of an eight-thin resistor configuration, which can be utilized to implement sensor 302 (which is analogous to sensor 102) is depicted in FIG. 4.

Figure 4:
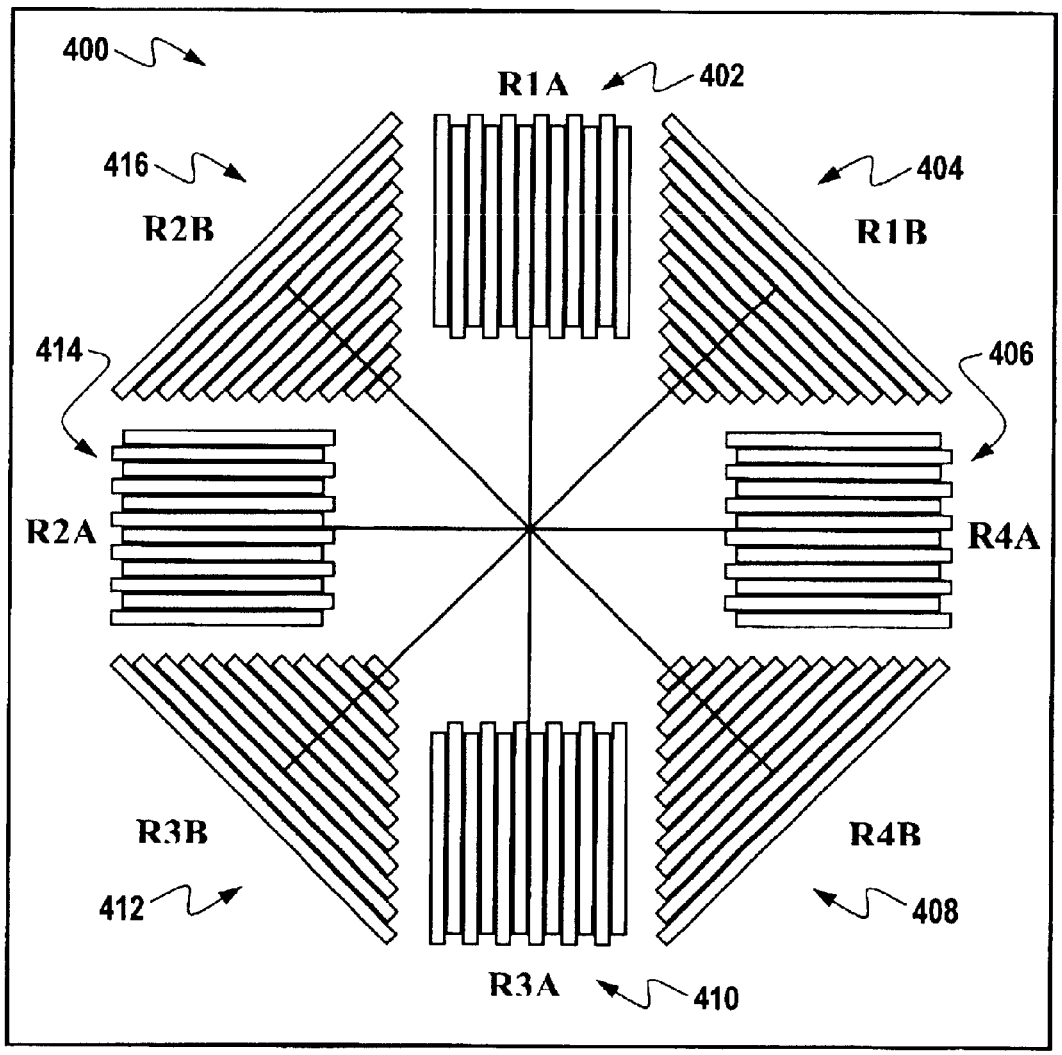
FIG. 4 depicts a block diagram of an MR sensor, which can be utilized in accordance with an alternative embodiment of the present invention.

FIG. 4 depicts a schematic diagram of a two-magnetoresistive sensing bridge circuit 400, which can be implemented in accordance with the invention described herein. FIG. 4 generally illustrates a layout of eight resistors arranged between two Wheatstone sensing bridges. It can be appreciated by those skilled in the art that the configuration depicted in FIG. 4 represents one of many possible magnetoresistive sensing designs that can be utilized in accordance with the invention described herein. Fewer or additional resistors and/or resistor patterns can be utilized, depending on a desired application. In FIG. 4, a first bridge circuit can include rectangular shaped resistor patterns 402, 414, 410, and 406 (i.e., respectively labeled resistors R1A, R2A, R3A, and R4A), which can be electrically connected to form a single Wheatstone bridge. A second bridge circuit (i.e., Bridge B), whose resistors are oriented at 45° to those of Bridge A and triangular in their shape patterns, is configured from resistors 404, 416, 412, and 408 (i.e., respectively labeled resistors R1B, R2B, R3B, and R4B).

The four-axis symmetry of the eight-resistor layout pattern illustrated in FIG. 4 represents only one example of an arrangement of two sensing bridges. Other eight resistor patterns can be constructed, for example, having a less symmetrical or non-symmetrical arrangement but having all eight resistors with identical shape and size. At least two separate sensing bridges can thus share a common geometrical center point and can also be rotated from one another (i.e., in this case 45° although other angles are possible) to provide signals offset from one another.

Figure 5:
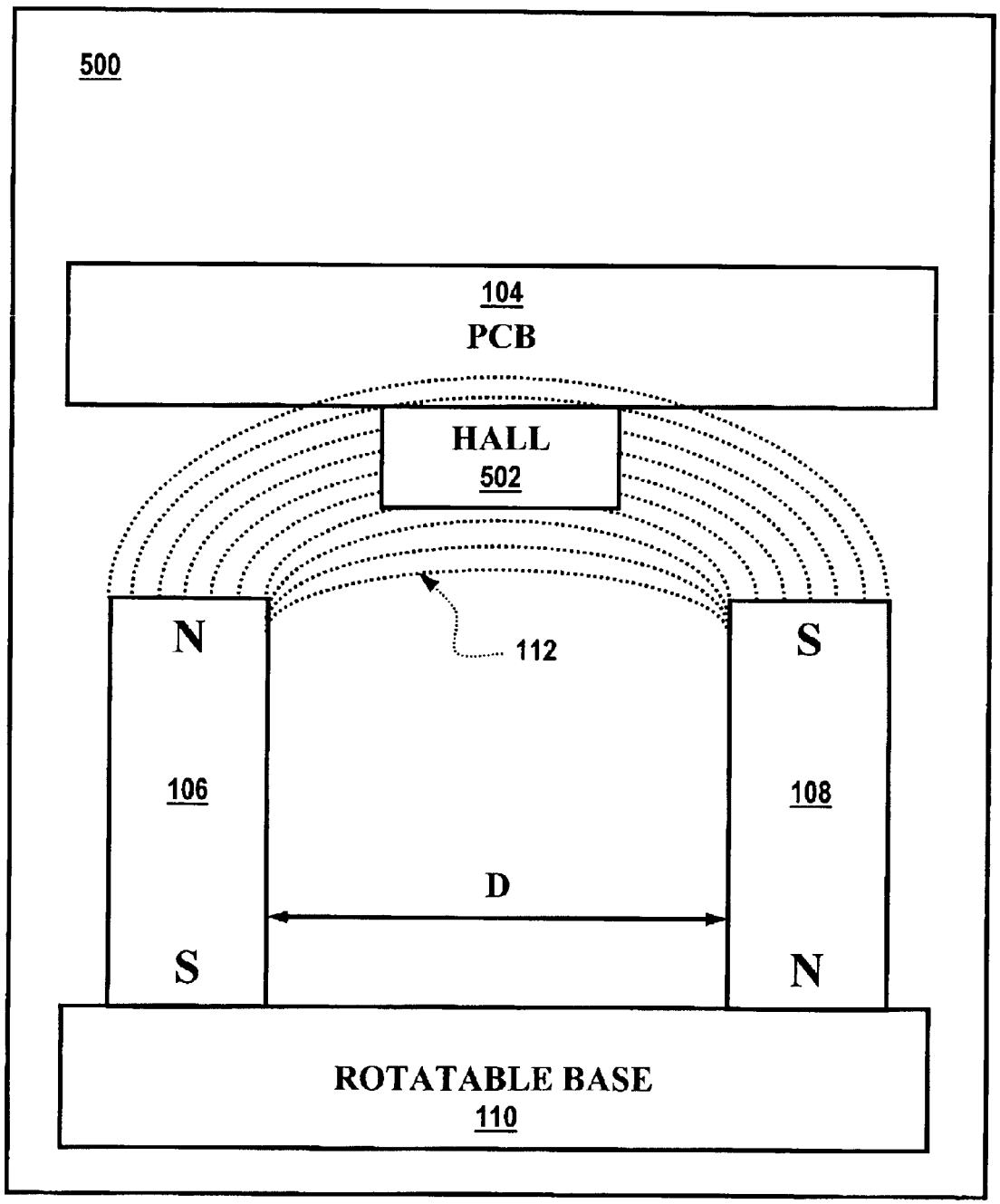
FIG. 5 depicts a side view of an angular position sensing apparatus and a Hall sensor thereof, which can be implemented in accordance with an alternative embodiment of the present invention.

FIG. 5 depicts a side view of an angular position sensing apparatus 500 and a Hall sensor 502 thereof, which can be implemented in accordance with an alternative embodiment of the present invention. Note that in FIGS. 1, 2 and 5, like or analogous parts are indicated by identical reference numerals. Thus, Hall sensor 502 can be positioned above and centrally proximate to first and second magnets 106 and 108. Hall sensor 502 can also be connected to and/or integrated with PCB 104. Hall sensor 502 is generally based on the Hall effect, well known in the art. A typical Hall sensor can be configured from one or more Hall elements. The configuration illustrated in FIG. 5 can be utilized, for example, in automotive applications such as crankshaft and camshaft speed and position applications.

In its simplest form, a Hall element can be constructed from a thin sheet of conductive material with output connections perpendicular to the direction of electrical current flow. When subjected to a magnetic field, the Hall effect element responds with an output voltage that is proportional to the magnetic field strength. The combination of a Hall effect element in association with its associated signal conditioning and amplifying electronics is sometimes called a Hall effect transducer. Those skilled in the art can appreciate that a variety of Hall effect sensors or transducers can be utilized in accordance with the invention described herein, depending upon desired applications and designs.

In both horizontal and vertical Hall elements, the output signal from the Hall element is generally representative of the magnitude of the magnetic field, which is perpendicular to the sensing plane of the Hall effect element and perpendicular to the direction of current flow through the Hall element. This principle is well known to those skilled in the art and is true for both horizontal and vertical Hall elements.

Figure 6:
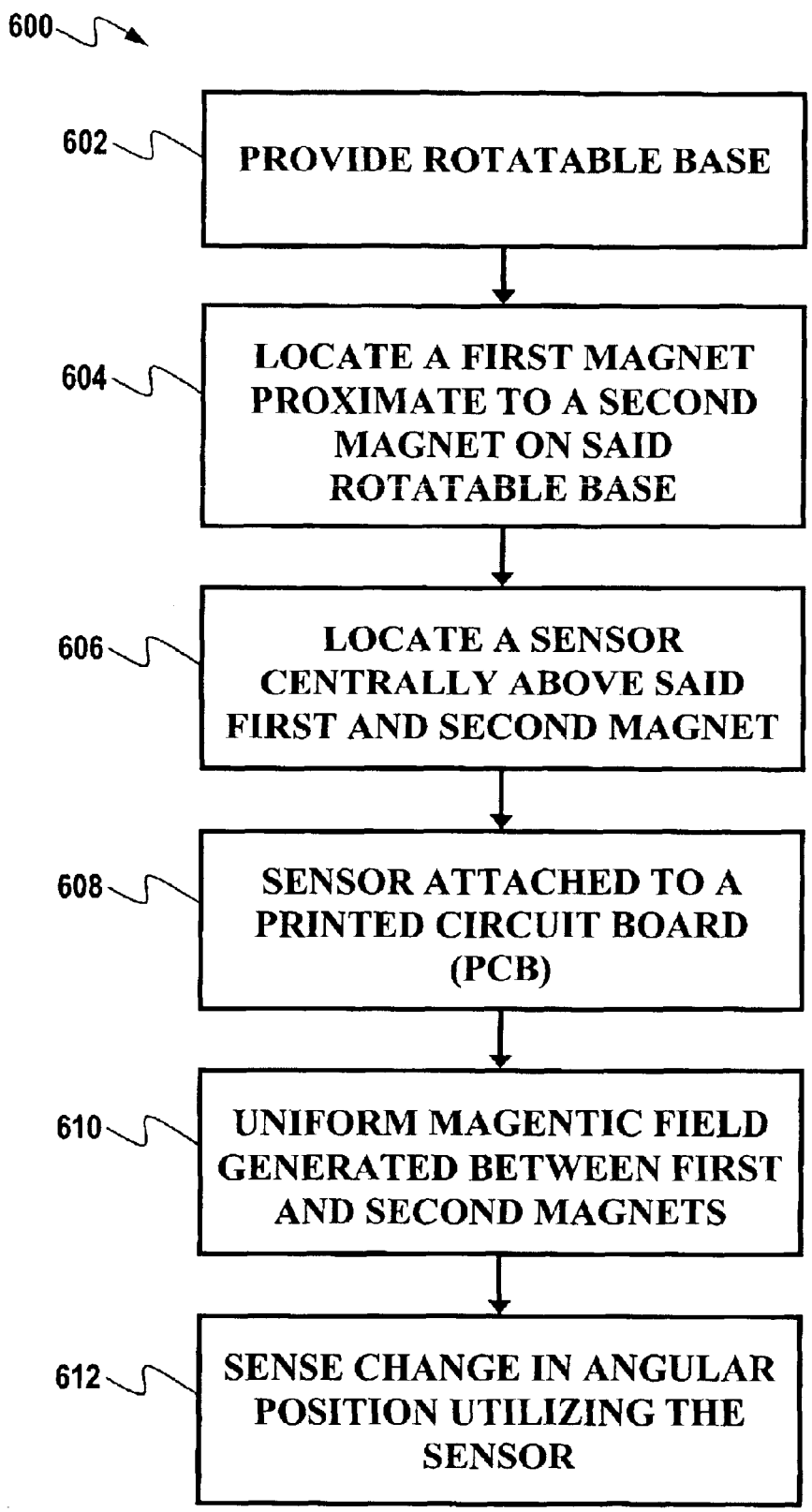
FIG. 6 illustrates a flow chart of logical operational steps that can be followed to implement an angular position sensing apparatus, in accordance with a preferred embodiment of the present invention.

FIG. 6 illustrates a flow chart 600 of logical operational steps that can be followed to implement an angular position sensing apparatus, in accordance with a preferred embodiment of the present invention. As illustrated at block 602, a rotatable base (e.g., rotatable base 110) is generally provided. Next, as indicated at block 604, a first magnet (e.g., magnet 106) can be located proximate to a second magnet (e.g., magnet 108) upon and/or attached to the rotatable base. The two magnets are generally magnetized parallel and opposite to one another to create a uniform magnetic field thereof.

As indicated thereafter at block 606, the sensor (e.g., sensor 102) is centrally located in a non-overlapping manner above the first and second magnets. As indicated at block 608, the sensor can be connected or attached to a printed circuit board (e.g., 104). When the two magnets are located a sufficient distance from one another, uniform magnetic field lines (e.g., magnetic field 112) are generated between the first and second magnets, as illustrated at block 610. Thereafter, as depicted at block 612, the sensor can then sense a change in the angular position of the first and second magnets as the rotatable base experiences a change in angular position.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. An angular position sensing apparatus, said apparatus comprising:

a rotatable base;

at least two magnets located proximate to one another upon said rotatable base, wherein said at least two magnets are magnetized parallel and opposite to one another to create a uniform magnetic field thereof; and a sensor radially centered between said at least two magnets and displaced an axial distance from the top surfaces of said at least two magnets, such that said sensor comes into contact with said uniform magnetic field without overlapping said rotating at least two magnets to sense a change in angular position associated with said rotatable base.

2. The apparatus of claim 1 wherein said sensor is mounted on a printed circuit board external to said at least two magnets.

3. The apparatus of claim 1 wherein said sensor comprises a Hall sensor.

4. The apparatus of claim 1 wherein said sensor comprises an integrated circuit.

5. The apparatus of claim 1 wherein said at least two magnets comprise a first magnet and a second magnet located a distance from one another to thereby generate said uniform magnetic field between said at least two magnets.

6. The apparatus of claim 1 wherein said sensor comprises a magnetoresistive sensor.

7. The apparatus of claim 6 wherein said magnetoresistive sensor comprises a plurality of magnetoresistors arranged within a magnetoresistive bridge circuit.

8. The apparatus of claim 6 wherein said magnetoresistive sensor comprises two magnetoresistive bridge circuits integrated with one another in a Wheatstone bridge configuration, wherein each of said magnetoresistive bridge circuits comprises four magnetoresistors.

9. An angular position sensing apparatus, said apparatus comprising:

a rotatable base;

at least two magnets located proximate to one another upon said rotatable base, wherein said at least two magnets are magnetized parallel and opposite to one another to create a uniform magnetic field thereof; and a magnetoresistive sensor radially centered between said at least two magnets and displaced an axial distance from the top surfaces of said at least two magnets, such that said magnetoresistive sensor comes into contact with said uniform magnetic field without overlapping said rotating at least two magnets to sense a change in angular position associated with said rotatable base and wherein said magnetoresistive sensor comprises a plurality of magnetoresistors within a magnetoresistive bridge circuit mounted on a printed circuit board.

10. A method for angular position sensing, said method comprising the steps of:

providing a rotatable base;

locating at least two magnets proximate to one another upon said rotatable base, wherein said at least two magnets are magnetized parallel and opposite to one another to create a uniform magnetic field thereof;

positioning a sensor external to said at least two magnets wherein said sensor is radially centered between said at least two magnets and displaced an axial distance from the top surfaces of said at least two magnets such that said sensor comes into contact with said uniform magnetic field without overlapping said rotating at least two magnets; and sensing said uniform magnetic field at said positioned sensor to determine a change in angular position associated with said rotatable base.

11. The method of claim 10 further comprising the step of: mounting said sensor on a printed circuit board.

12. The method of claim 10 further comprising the step of: configuring said sensor to comprise a Hall sensor.

13. The method of claim 10 wherein said sensor comprises an integrated circuit.

14. The method of claim 10 further comprising the step of: configuring said at least two magnets to comprise a first magnet and a second magnet located a distance from one another to thereby generate said uniform magnetic field between said at least two magnets.

15. The method of claim 10 further comprising the step of: configuring said sensor to comprise a magnetoresistive sensor.

16. The method of claim 15 further comprising the step of: configuring said magnetoresistive sensor to comprise a plurality of magnetoresistors arranged within a magnetoresistive bridge circuit.

17. The method of claim 15 further comprising the step of: configuring said magnetoresistive sensor to comprise two magnetoresistive bridge circuits integrated with one another in a Wheatstone bridge configuration, wherein each of said magnetoresistive bridge circuits comprises four magnetoresistors.

18. A method for angular position sensing, said method comprising the steps of:

providing a rotatable base;

locating at least two magnets proximate to one another upon said rotatable base, wherein said at least two magnets are magnetized parallel and opposite to one another to create a uniform magnetic field thereof;

positioning a magnetoresistive sensor external to said at least two magnets wherein said magnetoresistive sensor is radially centered between said at least to magnets and displaced an axial distance from the top surfaces of said at least two magnets such that said magnetoresistive sensor comes into contact with said uniform magnetic field without overlapping said rotating at least two magnets;

configuring said magnetoresistive sensor to comprise a plurality of magnetoresistors within a magnetoresistive bridge circuit; and sensing said uniform magnetic field at said magnetoresistive sensor to determine a change in angular position associated with said rotatable base.

* * * * *